(12) United States Patent
Cheng et al.

(10) Patent No.: US 8,411,473 B2
(45) Date of Patent: Apr. 2, 2013

(54) THREE-PHASE POWER SUPPLY WITH THREE-PHASE THREE-LEVEL DC/DC CONVERTER

(75) Inventors: Chaur-Ping Cheng, Taipei (TW); Chih-Hsing Fang, Taipei (TW); Wen-Wei Chan, Taipei (TW); Po-Yuan Chen, Taipei (TW)

(73) Assignee: Allis Electric Co., Ltd., Taipei (TW)

( * ) Notice: Subject to any disclaimer, the term of this patent is extended or adjusted under 35 U.S.C. 154(b) by 260 days.

(21) Appl. No.: 12/972,794

(22) Filed: Dec. 20, 2010

(65) Prior Publication Data

US 2012/0155124 A1 Jun. 21, 2012

(51) Int. Cl.
*H02M 5/45* (2006.01)
*H02M 3/335* (2006.01)
*H02M 7/08* (2006.01)

(52) U.S. Cl. .................. 363/37; 363/17; 363/47; 363/67

(58) Field of Classification Search .................... 363/15, 363/16, 17, 34, 37, 67, 69, 86, 126, 44, 47
See application file for complete search history.

(56) References Cited

U.S. PATENT DOCUMENTS

| 6,411,527 | B1 * | 6/2002 | Reinold | 363/17 |
| 7,518,886 | B1 * | 4/2009 | Lai et al. | 363/17 |
| 8,102,161 | B2 * | 1/2012 | Nakahori | 323/255 |
| 2004/0037092 | A1 * | 2/2004 | Kurio et al. | 363/17 |

* cited by examiner

*Primary Examiner* — Gary L Laxton
(74) *Attorney, Agent, or Firm* — Chun-Ming Shih; HDLS IPR Services (57) ABSTRACT

A three-phase power supply with a three-phase three-level DC/DC converter includes a full-bridge thyristor converter with three-set four in-series power switch elements, a three-phase isolated transformer, a full-bridge rectifier, a rectifying circuit, and a low-pass filtering circuit. The three-phase power supply is used to deliver power energy from the AC input voltage to the load. The power switch elements, which separated to each other at 120-degree phase differences, are controlled through a phase shift scheme. Therefore, the three-level circuit structure is provided to reduce withstanding voltage of the power switch elements, further the zero-voltage switching (ZVS) is achieved by the isolated transformer and the power switch elements to increase the efficiency of the DC/DC converter.

4 Claims, 9 Drawing Sheets

THREE-PHASE POWER SUPPLY WITH THREE-PHASE THREE-LEVEL DC/DC CONVERTER

BACKGROUND OF THE INVENTION

1. Field of the Invention

The present invention relates to a three-phase power supply, and more particularly to a three-phase power supply with a three-phase three-level DC/DC converter.

2. Description of Prior Art

With the development of power semiconductor technology, many electronic products are now light-weight, thin, and compact, and this trend will continue. The traditional linear power supply has cumbersome isolated transformers and heat sinks therein, thus the linear power supply has already been eliminated gradually due to low efficiency. Instead of the linear power supply, the switching power supply is used for high-frequency operations. The switching power supply has a lot of advantages, including smaller volume, lighter weight, and higher efficiency.

In general, the switching power supply adopts a traditional hard switching technology. When the operation frequency increases, therefore, the switching losses of turning on and turning off the power switching elements will increase with frequency. However, this will result in large heat losses to reduce efficiency and lifetime of the switching power supply. In addition, the heat dissipating apparatus is needed to install, while volume and costs increase. More particularly, non-ideal effect of switching the power switching elements causes problems of higher voltage and current stress as well as electromagnetic interference.

In order to overcome the above-mentioned problems, a soft switching technology is applied to various power electronic products. The soft switching technology can be broadly classified into two types: (1) zero voltage switching (ZVS), and (2) zero current switching (ZCS). The ZVS is achieved to reduce the voltage across the power switching element to zero before turning on the power switching element, whereas the ZCS is achieved to reduce the current through the power switching element to zero before turning on the power switching element. The soft switching technology—ZVS or ZCS, is achieved by producing a zero power of multiplying the voltage across the power switching element and the current through thereof. Accordingly, this will reduce switching losses, increase efficiency, and reduce noises of the power switching elements. However, the ZCS is achieved to cause switching losses due to electric charges stored in the power switching elements. Hence, the ZVS is preferred for high-frequency operations.

Accordingly, it is desirable to provide a three-phase power supply with a three-phase three-level DC/DC converter to reduce withstanding voltage of the power switch elements, further the zero-voltage switching (ZVS) is achieved by the isolated transformer and the power switch elements through the PWM (pulse width modulation) technology to increase the efficiency of the DC/DC converter.

SUMMARY OF THE INVENTION

In order to achieve the above-mentioned objectives, a three-phase power supply with a three-phase three-level DC/DC converter is disclosed. The three-phase three-level DC/DC converter receives a DC voltage and each phase of the three-phase three-level DC/DC converter includes a full-bridge switching circuit with four series switches, an isolated transformer, a rectifying circuit, and a low-pass filtering circuit.

The full-bridge switching circuit with four series switches includes an upper arm and a lower arm. The upper arm has a first power switch element and a second power switch element and the lower arm has a third power switch element and a fourth power switch element to switch the DC voltage into a rectangular voltage, respectively. In particular, each of the power switch elements has an anti-parallel diode and a parasitic capacitance, respectively.

The isolated transformer has a primary-side winding and a secondary-side winding. The primary-side winding is electrically connected to the full-bridge switching circuit to receive the rectangular voltage and vary the magnitude of the rectangular voltage according to the turn ratio between the primary-side winding and the secondary-side winding. In addition, the isolated transformer provides an electrical isolation protection.

The rectifying circuit is electrically connected to the secondary-side winding of the isolated transformer to rectify an output voltage produced from the secondary-side winding.

The low-pass filtering circuit is electrically connected to the rectifying circuit to filter out high-frequency harmonic components of the rectified output voltage of the rectifying circuit and output a DC output voltage.

Therefore, the three-level circuit structure is provided to reduce withstanding voltage of the power switch elements, further the zero-voltage switching (ZVS) is achieved by the isolated transformer and the power switch elements to increase the efficiency of the DC/DC converter.

In order to achieve the above-mentioned objectives, a three-phase power supply with a three-phase three-level DC/DC converter is disclosed. The three-phase power supply receives a three-phase AC voltage and each phase of the three-phase power supply includes a full-bridge thyristor converter, a full-bridge rectifier, a full-bridge switching circuit with four series switches, an isolated transformer, a rectifying circuit, and a low-pass filtering circuit.

The full-bridge thyristor converter has two thyristors electrically connected in series to each other to convert the AC voltage into a DC voltage.

The full-bridge rectifier has two power switch elements electrically connected in series to each other to receive and rectify the DC voltage outputted from the full-bridge thyristor converter.

The full-bridge switching circuit with four series switches has an upper arm and a lower arm. The upper arm has a first power switch element and a second power switch element and the lower arm has a third power switch element and a fourth power switch element to switch the DC voltage into a rectangular voltage, respectively. In particular, each of the power switch elements has an anti-parallel diode and a parasitic capacitance, respectively.

The isolated transformer has a primary-side winding and a secondary-side winding. The primary-side winding is electrically connected to the full-bridge switching circuit to receive the rectangular voltage and vary the magnitude of the rectangular voltage according to the turn ratio between the primary-side winding and the secondary-side winding. In addition, the isolated transformer provides an electrical isolation protection.

The rectifying circuit is electrically connected to the secondary-side winding of the isolated transformer to rectify an output voltage produced from the secondary-side winding.

The low-pass filtering circuit is electrically connected to the rectifying circuit to filter out high-frequency harmonic components of the rectified output voltage of the rectifying circuit and output a DC output voltage.

Therefore, the three-level circuit structure is provided to reduce withstanding voltage of the power switch elements, further the zero-voltage switching (ZVS) is achieved by the isolated transformer and the power switch elements to increase the efficiency of the DC/DC converter.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Reference will now be made to the drawing figures to describe the present invention in detail.

Figure 1:
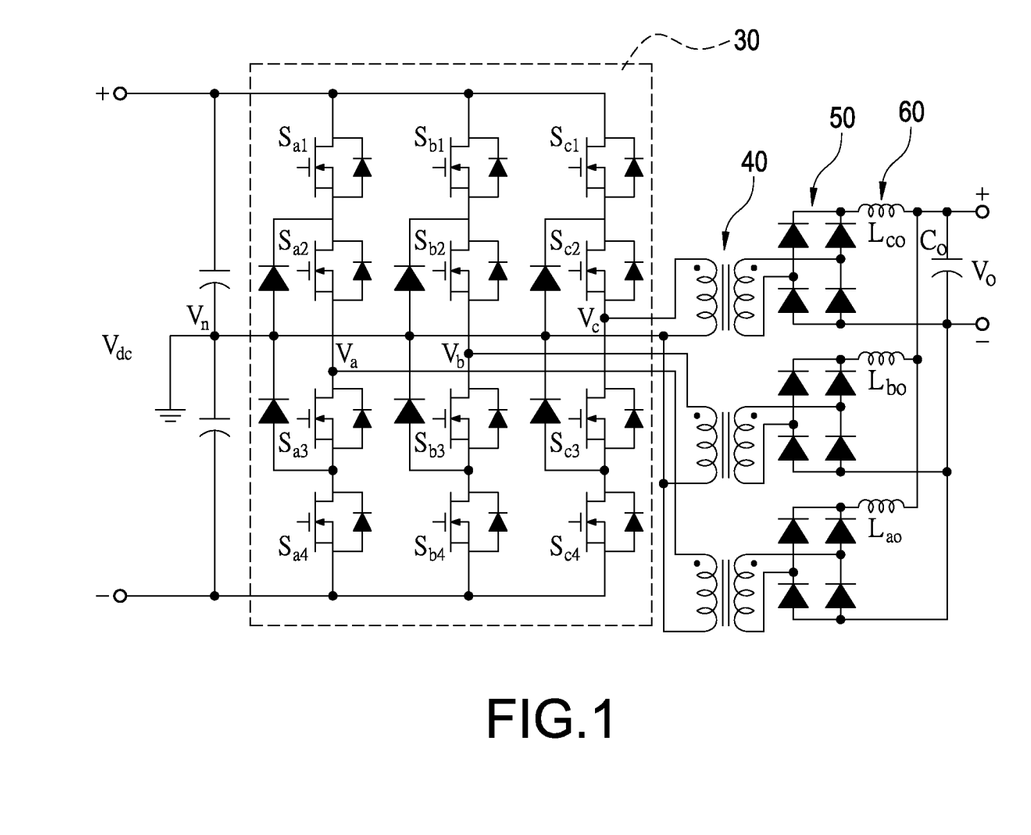
FIG. 1 is a circuit diagram of a three-phase three-level DC/DC converter according to a first embodiment of the present invention.
Figure 2:
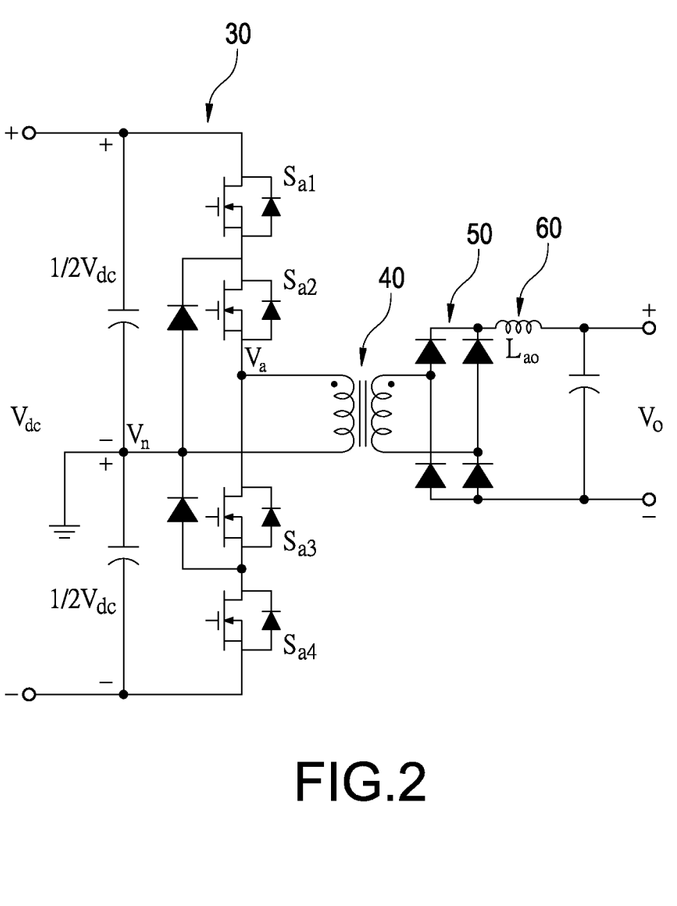
FIG. 2 is a circuit diagram of a-phase circuit of the first embodiment.

The detailed description of the three-phase three-level DC/DC converter will be made hereinafter with reference to FIG. 1 and FIG. 2. Reference is made to FIG. 1 and FIG. 2 which are a circuit diagram of a three-phase three-level DC/DC converter according to a first embodiment and a circuit diagram of a-phase circuit of the first embodiment of the present invention, respectively. Each phase of the three-phase three-level DC/DC converter includes a full-bridge switching circuit with four series switches 30, an isolated transformer 40, a rectifying circuit 50, and a low-pass filtering circuit 60.

The three-phase three-level DC/DC converter receives a DC input voltage Vdc. The DC input voltage Vdc is divided exactly in half, namely ½×Vdc, through a voltage-dividing capacitor (not labeled), and the divided voltage (½×Vdc) appears across an upper arm (not labeled) and a lower arm (not labeled) of the full-bridge switching circuit 30. In particular, the voltage-dividing capacitor has an upper voltage-dividing capacitor and a lower voltage-dividing capacitor. The upper arm is electrically connected to the upper voltage-dividing capacitor in parallel. The upper arm has a first power switch element Sa1 and a second power switch element Sa2, and the first power switch element Sa1 is electrically connected to the second power switch element Sa2 in series. The lower arm is electrically connected to the lower voltage-dividing capacitor in parallel. The lower arm has a third power switch element Sa3 and a fourth power switch element Sa4, and the third power switch element Sa3 is electrically connected to the fourth power switch element Sa4 in series. For convenience, the subscript a, b, and c represent the a-phase, b-phase, and c-phase of the three-phase full-bridge switching circuit 30, respectively. The full-bridge switching circuit 30 has four power switch elements, namely, the first power switch element Sa1, the second power switch element Sa2, the third power switch element Sa3, and the fourth power switch element Sa4 to switch the divided voltage (½×Vdc) across the upper arm and the lower arm into a rectangular voltage. In particular, each of the power switch elements has an anti-parallel diode (also called as a body diode, not labeled) and a parasitic capacitance (not labeled), respectively. The isolated transformer 40 has a primary-side winding (not labeled), a secondary-side winding (not labeled), and a primary-side leakage inductance (not shown). The primary-side winding of the isolated transformer 40 is electrically connected to the full-bridge switching circuit 30 to receive the rectangular voltage and vary the magnitude of the rectangular voltage according to the turn ratio between the primary-side winding and the secondary-side winding. In addition, the isolated transformer 40 provides an electrical isolation protection between the primary-side circuit and the secondary-side circuit. The rectifying circuit 50 is electrically connected to the secondary-side winding of the isolated transformer 40 to rectify an output voltage produced from the secondary-side winding. A full-wave rectifying circuit is constructed because the secondary-side winding per phase of the isolated transformer 40 is electrically connected to two in-series rectifying diodes (not labeled), respectively. The low-pass filtering circuit 60 is electrically connected to the rectifying circuit 50 to filter out high-frequency harmonic components of the rectified output voltage of the rectifying circuit 50 and output a DC output voltage Vo with a required voltage level to the load. In particular, the low-pass filtering circuit 60 is composed of a filtering inductor Lo and a filtering capacitor Co.

Figure 3A:
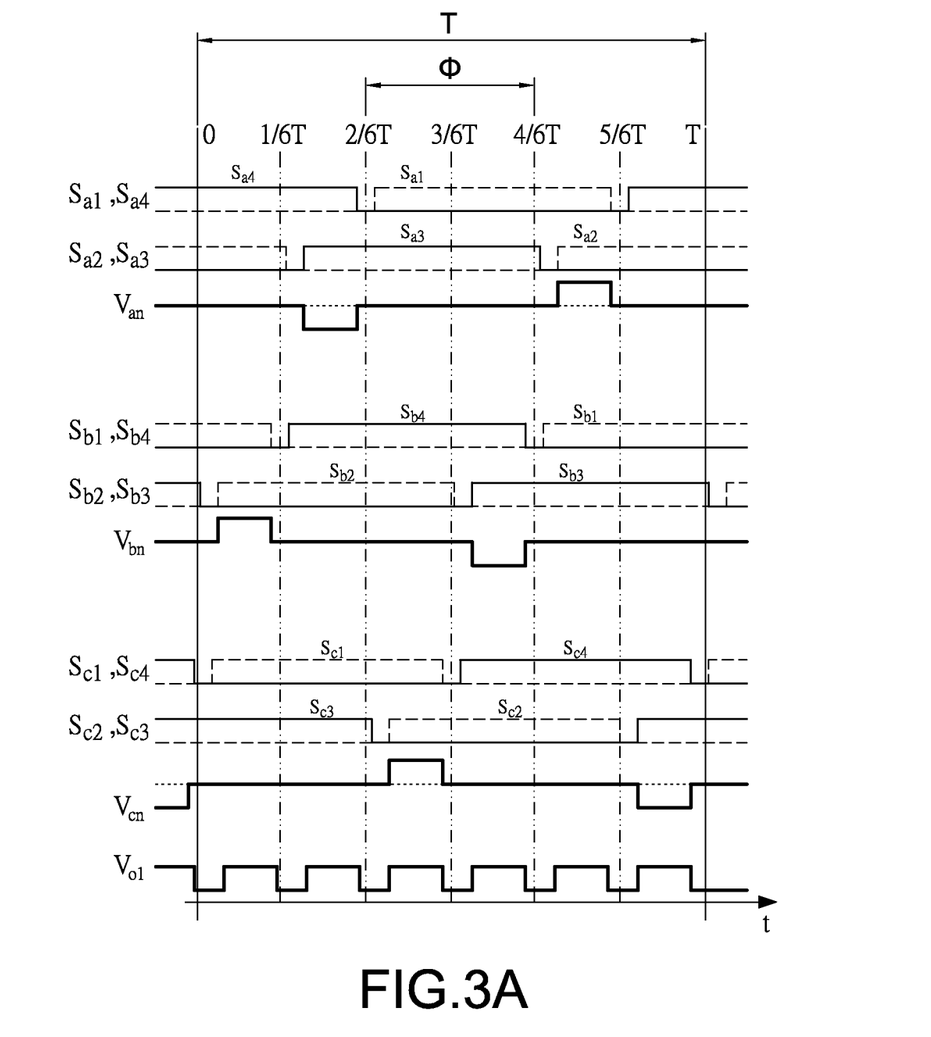
FIG. 3A is a waveform chart of controlling three-level power switches through a 120-degree phase shift scheme.
Figure 3B:
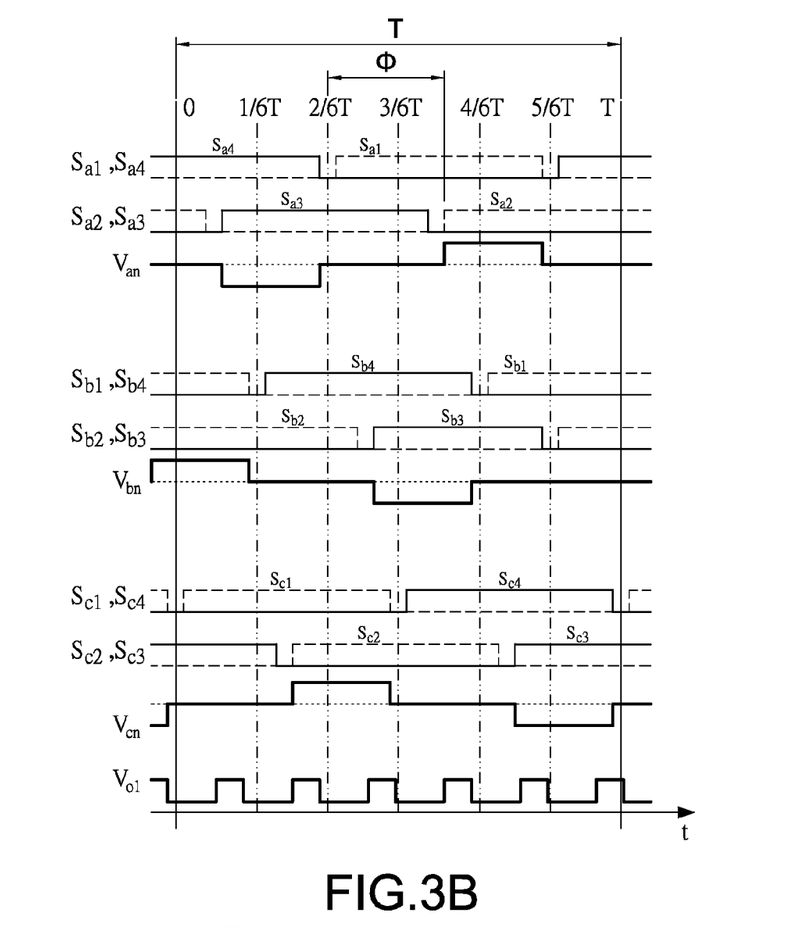
FIG. 3B is a waveform chart of controlling the three-level power switches through a 60-degree phase shift scheme.

The three-level power switch elements are driven by a phase-shift control and the power switch elements are separated to each other at 120-degree phase differences. In particular, the phase-shift control scheme can be generally classified into two types: 120-degree phase shift mode and 60-degree phase shift mode. In this embodiment, the 120-degree phase shift mode (any one phase is introduced so that the subscript a, b, and c is ignored) is exemplified for further demonstration. Reference is made to FIG. 3A which is a waveform chart of controlling three-level power switches through a 120-degree phase shift scheme. As shown in FIG. 3A, a first switch S1 and a fourth switch S4 are controlled through a complementary-level voltage, and a second switch S2 and a third switch S3 are controlled through another complementary-level voltage. When the second switch S2 is controlled, the first switch S1 relatively shifts forward a phase-shifted angle φ. In particular, the phase-shifted angle φ is greater than 120 degrees (φ>120°), and the three switches S1, S2, S3 are separated to each other at 120-degree phase differences. The phase modulation outputs are shown in FIG. 3A as a-phase voltage Van (relatively to a neutral-point voltage Vn), b-phase voltage Vbn, and c-phase voltage Vcn. Further, the phase modulation outputs are processes through back-end circuits (referring to the isolated transformer 40, the rectifying circuit 50, and the low-pass filtering circuit 60) to produce a first output voltage Vo1. That is, the pulse widths of the phase voltages Van, Vbn, Vcn are modulated through the phase-shifted angle φ to obtain the first output voltage Vo1. In another embodiment, the 60-degree phase shift mode is exemplified for further demonstration. Reference is made to FIG. 3B which is a waveform chart of controlling the three-level power switches through a 60-degree phase shift scheme. As shown in FIG. 3B, the first switch S1 and the fourth switch S4 are controlled through a complementary-level voltage, and the second switch S2 and the third switch S3 are controlled through another complementary-level voltage. When the second switch S2 is controlled, the first switch S1 relatively shifts forward a phase-shifted angle φ. In particular, the phase-shifted angle φ is greater than 60 degrees and less than 120 degrees (120°>φ>60°), and the three switches S1, S2, S3 are separated to each other at 120-degree phase differences. The phase modulation outputs are shown in FIG. 3B as the a-phase voltage Van (relatively to a neutral-point voltage Vn), the b-phase voltage Vbn, and the c-phase voltage Vcn, and the voltage width of the phase voltages Va, Vb, Vc are greater than 60 degrees. Further, the phase modulation outputs are processes through back-end circuits (referring to the isolated transformer 40, the rectifying circuit 50, and the low-pass filtering circuit 60) to produce a rectified waveform, which is similarly that the first output voltage Vo1 adds a superimposed voltage to provide a higher-voltage control.

Figure 3C:
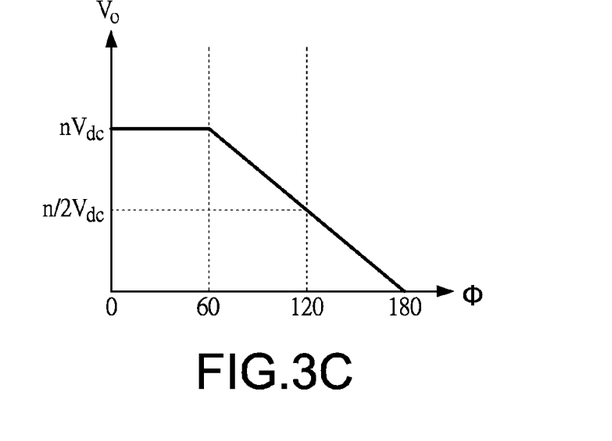
FIG. 3C is a curve chart of the output voltage gain.

Reference is made to FIG. 3C which is a curve chart of the output voltage gain. The voltage gain curve of the output voltage Vo is linear because the three-level switches are controlled through the phase shift scheme.

In addition, the three-phase three-level DC/DC converter is associated with a feedback control circuit (not shown). By controlling different phase shift between these power switch elements, thus the output voltage Vo is regulated. The feedback control circuit mainly includes a voltage compensation circuit (not shown), a boost/phase-shifted controller (not shown), and a switch driving unit (not shown). The voltage compensation circuit is electrically connected to the low-pass filtering circuit 60 to receive the output voltage Vo outputted from the DC/DC converter and produce an output compensation voltage. The boost/phase-shifted controller 70 is electrically connected to the voltage compensation circuit to receive the output compensation voltage and produce four switch driving signals per phase by controlling a duty cycle of an output square-wave voltage of the boost/phase-shifted controller according to the output compensation voltage. The switch driving unit is electrically connected to the boost/phase-shifted controller and the full-bridge switching circuit 30 to receive the switch driving signals outputted from the boost/phase-shifted controller and control the corresponding power switch elements Sa1~Sa4, Sb1~Sb4, Sc1~Sc4, respectively. In addition, due to non-linearity turn-on delay and turn-off delay of the power switch elements, the power switch elements element do not immediately turn-on or turn-off when being driven. In this embodiment, in order to avoid the first power switch element Sa1 and the second power switch element Sa2 or the third power switch element Sa3 and the fourth power switch element Sa4 turning on or turning off simultaneously, a short delay time or so-called dead-time has to be added. More particularly, the delay time plays an important role in achieving ZVS (zero-voltage switching) of these power switch elements Sa1~Sa4.

Therefore, the three-level circuit structure is provided to reduce withstanding voltage of the power switch elements Sa1~Sa4, Sb1~Sb4, Sc1~Sc4, further the ZVS is achieved by leakage inductances (not shown) of the isolated transformer 40 and the anti-parallel diodes and parasitic capacitances of the power switch elements Sa1~Sa4 to increase the efficiency of the DC/DC converter.

Figure 4:
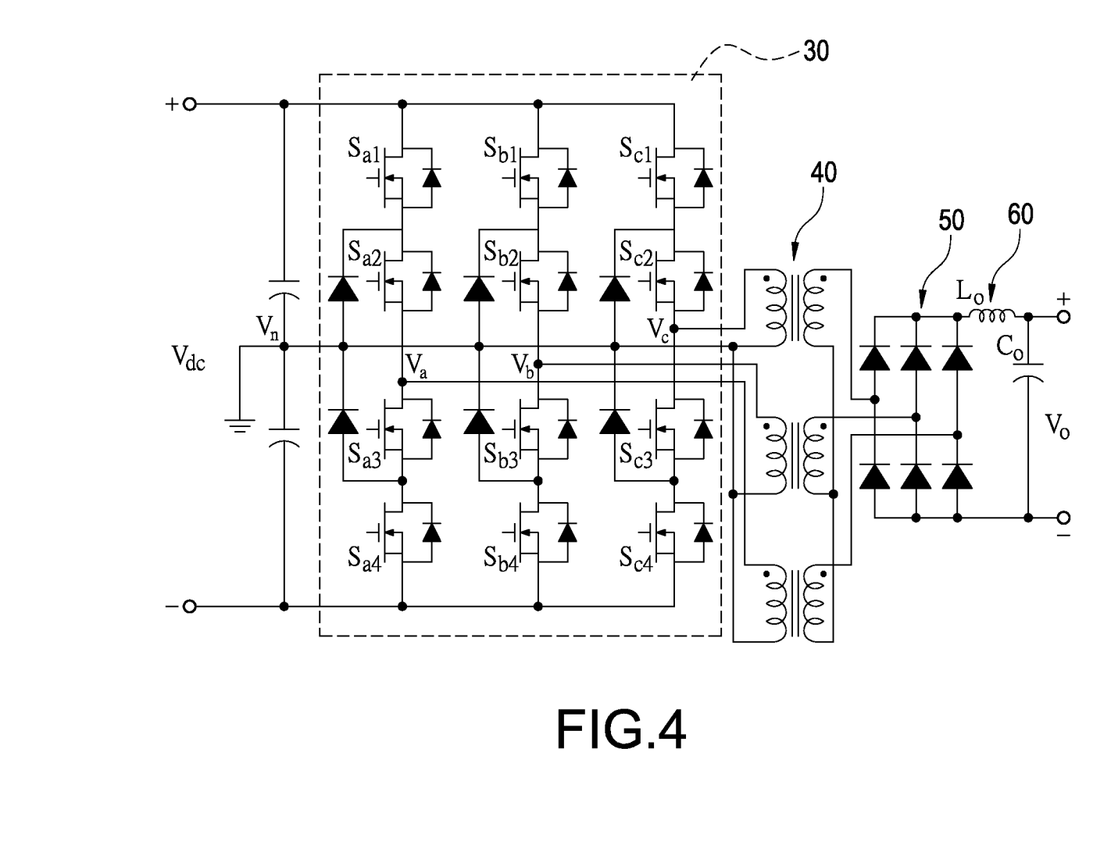
FIG. 4 is a circuit diagram of the three-phase three-level DC/DC converter according to a second embodiment.

Furthermore, reference is made to FIG. 4 which is a circuit diagram of the three-phase three-level DC/DC converter according to a second embodiment. Comparing this embodiment to the first embodiment (shown in FIG. 1), the significant difference between the two embodiments is that the secondary-side winding of the isolated transformer 40 is a Y connection structure. Hence, a full-wave rectifying circuit is constructed because the secondary-side winding per phase of the isolated transformer 40 is electrically connected to two in-series rectifying diodes (not labeled), respectively, thus reducing the amount of the rectifying diodes by half. In addition, only one filtering inductor Lo of the low-pass filtering circuit 60 needs to be used.

Figure 5:
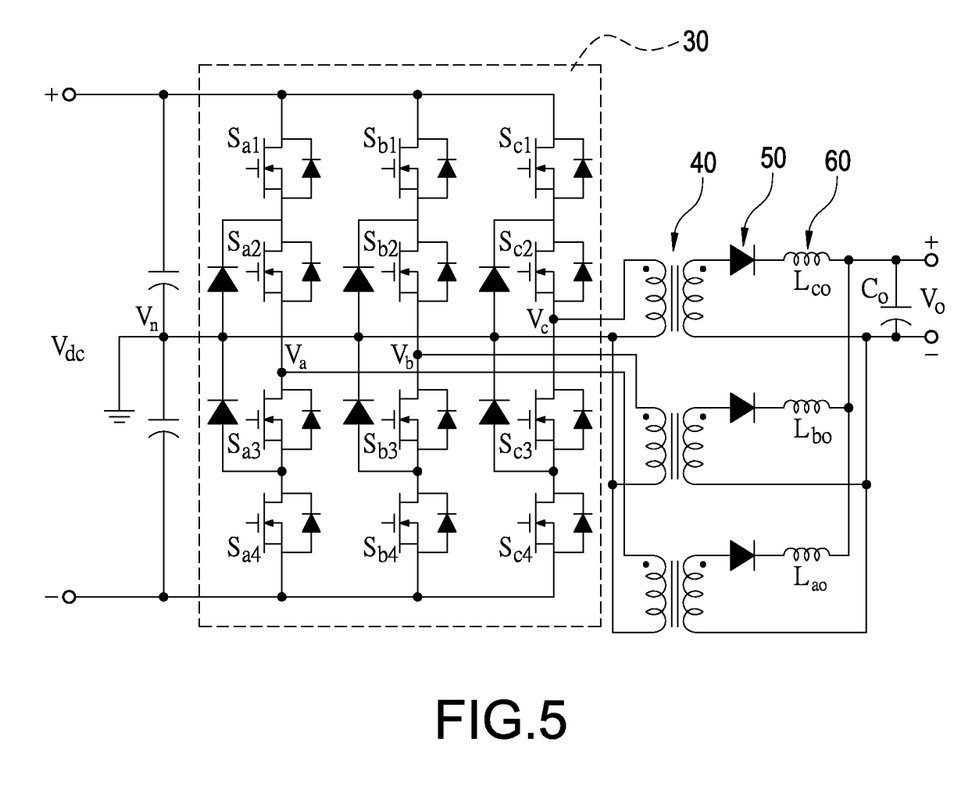
FIG. 5 is a circuit diagram of the three-phase three-level DC/DC converter according to a third embodiment.

Furthermore, reference is made to FIG. 5 which is a circuit diagram of the three-phase three-level DC/DC converter according to a third embodiment. Comparing this embodiment to the first embodiment (shown in FIG. 1), the significant difference between the two embodiments is that each secondary-side winding of the isolated transformer 40 is electrically connected to a rectifying diode (not labeled) to construct a half-wave rectifying circuit. Hence, the amount of the rectifying diodes of the rectifying circuit 50 can decrease by a factor of 4. In addition, the filtering inductors Lao~Lco of the low-pass filtering circuit 60 are electrically connected to the corresponding rectifying diodes, respectively.

Figure 6:
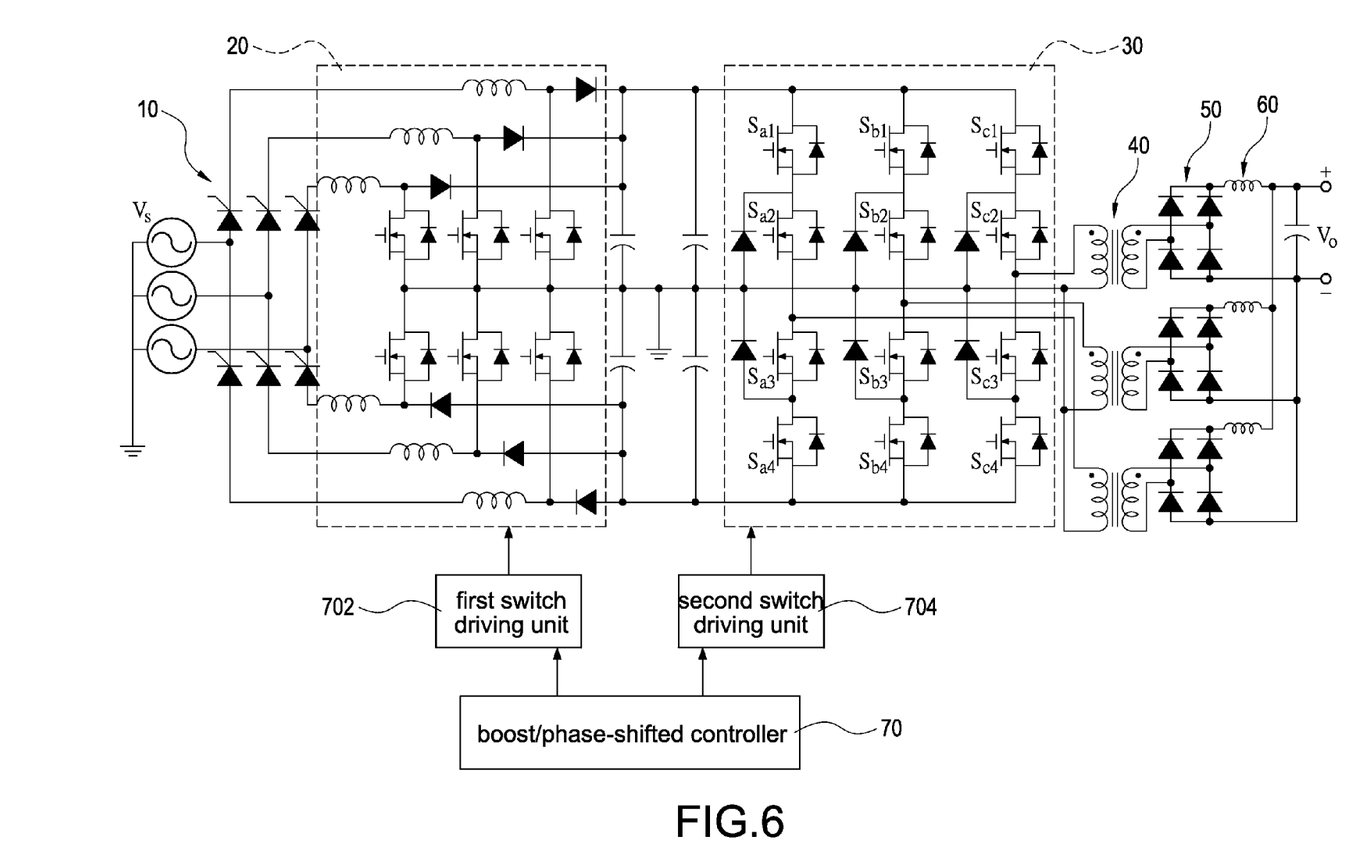
FIG. 6 is a circuit diagram of a first preferred embodiment of the three-phase power supply with a three-phase three-level DC/DC converter.

The above-mentioned three-phase three-level DC/DC converter topology can be applied to a three-phase power supply to implement the three-phase power supply having a three-phase three-level DC/DC converter. Reference is made to FIG. 6 which is a circuit diagram of a first preferred embodiment of the three-phase power supply with a three-phase three-level DC/DC converter. The three-phase power supply receives a three-phase AC voltage Vs. Each phase of the three-phase power supply includes a full-bridge thyristor converter 10, a full-bridge rectifier 20, a full-bridge switching circuit 30, an isolated transformer 40, a rectifying circuit 50, and a low-pass filtering circuit 60.

The full-bridge thyristor converter 10 has two thyristors electrically connected in series to each other to converter the AC voltage into a DC voltage Vdc. The full-bridge rectifier 20 has two power switch elements (not labeled) electrically connected in series to each other to receive and rectify the DC voltage outputted from the full-bridge thyristor converter 10. In addition, an output capacitor unit (not labeled) is electrically connected to the output of the full-bridge rectifier 20, and the capacitor unit has an upper output capacitor and a lower output capacitor. The full-bridge switching circuit 30 has an upper arm (not labeled) and a lower arm. The upper arm has a first power switch element Sa1 and a second power switch element Sa2 and the lower arm has a third power switch element Sa3 and a fourth power switch element Sa4 to switch the DC voltage Vdc into a rectangular voltage, respectively. In particular, each of the power switch elements has an anti-parallel diode (also called as a body diode, not labeled) and a parasitic capacitance (not labeled), respectively. The isolated transformer 40 has a primary-side winding (not labeled) and a secondary-side winding (not labeled). The primary-side winding (including a primary-side leakage inductance) of the isolated transformer 40 is electrically connected to the full-bridge switching circuit 30 to receive the rectangular voltage and vary the magnitude of the rectangular voltage according to the turn ratio between the primary-side winding and the secondary-side winding. In addition, the isolated transformer 40 also provides an isolation function between the primary-side circuit and the secondary-side circuit. The rectifying circuit 50 is electrically connected to the secondary-side winding of the isolated transformer 40 to rectify an output voltage produced from the secondary-side winding of the isolated transformer 40. The low-pass filtering circuit is electrically connected to the rectifying circuit 50 to filter out high-frequency harmonic components of the rectified output voltage of the rectifying circuit 50 and output a DC output voltage Vo with a required voltage level to the load. In particular, the low-pass filtering circuit 60 is composed of a filtering inductor Lo and a filtering capacitor Co.

In addition, the three-phase three-level DC/DC converter is associated with a feedback control circuit (not shown). By controlling different phase shift between these power switch elements Sa1~Sa4, Sb1~Sb4, Sc1~Sc4, thus the output voltage Vo is regulated. The feedback control circuit mainly includes a voltage compensation circuit (not shown), a boost/phase-shifted controller 70, a first switch driving unit 702, and a second switch driving unit 704. The voltage compensation circuit is electrically connected to the low-pass filtering circuit 60 to receive the output voltage Vo and produce an output compensation voltage. The boost/phase-shifted controller 70 is electrically connected to the voltage compensation circuit and the first switch driving unit 702 to receive the output compensation voltage and produce two switch driving signals per phase by controlling a duty cycle of an output square-wave voltage of the boost/phase-shifted controller 70 according to the output compensation voltage. Furthermore, the boost/phase-shifted controller 70 is electrically connected to the second switch driving unit 704 to produce four switch driving signals per phase. The first switch driving unit 702 is electrically connected to the boost/phase-shifted controller 70 and the full-bridge rectifier 20 to receive the switch driving signals outputted from the boost/phase-shifted controller 70, and control the corresponding power switch elements of the full-bridge rectifier 20, respectively. The second switch driving unit 704 is electrically connected to the boost/phase-shifted controller 70 and the full-bridge switching circuit 30 to receive the switch driving signals outputted from the boost/phase-shifted controller 70 and control the corresponding power switch elements Sa1~Sa4, Sb1~Sb4, Sc1~Sc4 of the full-bridge switching circuit 30, respectively. In addition, due to non-linearity turn-on delay and turn-off delay of the power switch elements, the power switch elements do not immediately turn-on or turn-off when being driven. In this embodiment, in order to avoid the first power switch element Sa1 and the second power switch element Sa2 or the third power switch element Sa3 and the fourth power switch element Sa4 turning on or turning off simultaneously, a short delay time or so-called dead-time has to be added. More particularly, the delay time plays an important role in achieving ZVS (zero-voltage switching) of these power switch elements Sa1~Sa4.

Therefore, the three-level circuit structure is provided to reduce withstanding voltage of the power switch elements Sa1~Sa4, Sb1~Sb4, Sc1~Sc4, further the ZVS is achieved by leakage inductances of the isolated transformer 40 and the anti-parallel diodes and parasitic capacitances of the power switch elements Sa1~Sa4 to increase the efficiency of the DC/DC converter.

Figure 7:
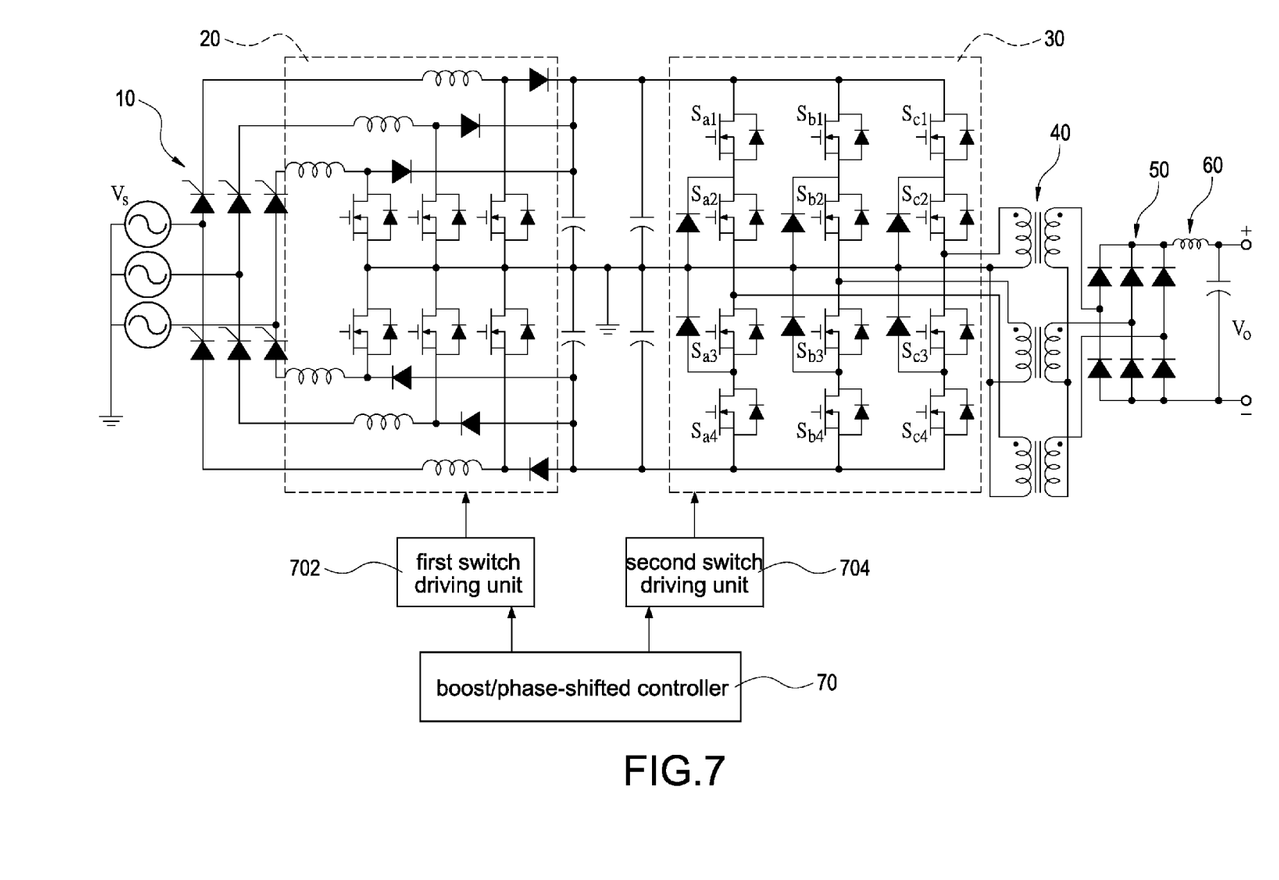
FIG. 7 is a circuit diagram of a second preferred embodiment of the three-phase power supply with a three-phase three-level DC/DC converter.

Furthermore, reference is made to FIG. 7 which is a circuit diagram of a second preferred embodiment of the three-phase power supply with a three-level DC/DC converter. Comparing this embodiment to the first embodiment (shown in FIG. 5), the significant difference between the two embodiments is that the secondary-side winding of the isolated transformer 40 is a Y connection structure. Hence, a full-wave rectifying circuit is constructed because the secondary-side winding per phase of the isolated transformer 40 is electrically connected to two in-series rectifying diodes (not labeled), respectively, thus reducing the amount of the rectifying diodes by half. In addition, only one filtering inductor Lo of the low-pass filtering circuit 60 needs to be used.

Figure 8:
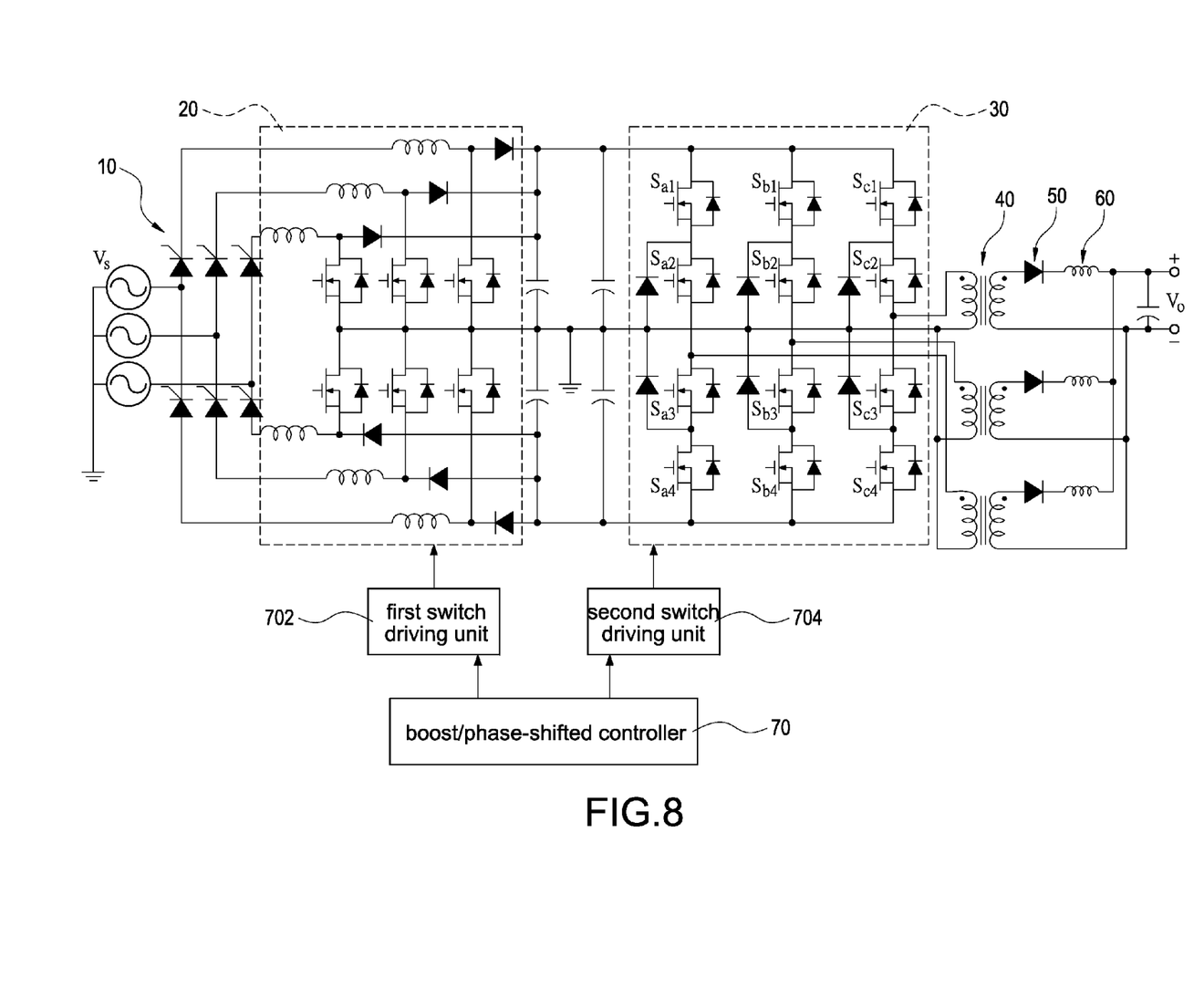
FIG. 8 is a circuit diagram of a third preferred embodiment of the three-phase power supply with a three-phase three-level DC/DC converter.

Furthermore, reference is made to FIG. 8 which is a circuit diagram of a third preferred embodiment of the three-phase power supply with a three-phase three-level DC/DC converter. Comparing this embodiment to the first embodiment (shown in FIG. 5), the significant difference between the two embodiments is that each secondary-side winding of the isolated transformer 40 is electrically connected to a rectifying diode (not labeled) to construct a half-wave rectifying circuit. Hence, the amount of the rectifying diodes of the rectifying circuit 50 can decrease by a factor of 4. In addition, the filtering inductors Lao~Lco of the low-pass filtering circuit 60 are electrically connected to the corresponding rectifying diodes, respectively.

In conclusion, the present invention has following advantages:

1. The three-level circuit structure is provided to reduce withstanding voltage of the power switch elements by half and
2. The ZVS is achieved by leakage inductances of the isolated transformer and the anti-parallel diodes and parasitic capacitances of the power switch elements through the PWM (pulse width modulation) technology.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A three-phase power supply with a three-phase three-level DC/DC converter receiving a three-phase AC voltage, each phase of the three-phase power supply comprising:
   a full-bridge thyristor converter having two thyristors electrically connected in series to each other to convert the AC voltage into a DC voltage;
   a full-bridge rectifier having two power switch elements electrically connected in series to each other to receive and rectify the DC voltage outputted from the full-bridge thyristor converter;
   a full-bridge switching circuit with four series switches including an upper arm and a lower arm, the upper arm having a first power switch element and a second power switch element and the lower arm having a third power switch element and a fourth power switch element to switch the DC voltage into a rectangular voltage, respectively; wherein each of the power switch elements has an anti-parallel diode and a parasitic capacitance, respectively;
   an isolated transformer having a primary-side winding and a secondary-side winding, and the primary-side winding electrically connected to the full-bridge switching circuit to receive the rectangular voltage and vary the magnitude of the rectangular voltage according to a turn ratio between the primary-side winding and the secondary-side winding;

a rectifying circuit electrically connected to the secondary-side winding of the isolated transformer to rectify an output voltage produced from the secondary-side winding; and a low-pass filtering circuit electrically connected to the rectifying circuit to filter out high-frequency harmonic components of the rectified output voltage of the rectifying circuit and output a DC output voltage;

whereby the three-level power supply is provided to reduce withstanding voltage of the power switch elements, further zero-voltage switching (ZVS) is achieved by the isolated transformer and the power switch elements to increase the efficiency of the DC/DC converter.

2. The three-phase power supply in claim 1, wherein the rectifying circuit is a full-wave rectifying circuit.

3. The three-phase power supply in claim 1, wherein the rectifying circuit is a half-wave rectifying circuit.

4. The three-phase power supply in claim 1, wherein the low-pass filtering circuit is composed of a filtering inductor and a filtering capacitor.

* * * * *